United States Patent [19]
Kujawa et al.

[11] Patent Number: 5,548,633
[45] Date of Patent: Aug. 20, 1996

[54] DATA COLLECTION NETWORK APPARATUS AND METHOD

[75] Inventors: Kim Kujawa, Regina; Erich Kirchner, Saskatoon; Michel Jarzab, Saskatoon; Homer Robson, Saskatoon, all of Canada

[73] Assignee: SaskTel, Regina, Canada

[21] Appl. No.: 233,498

[22] Filed: Apr. 26, 1994

Related U.S. Application Data

[63] Continuation of Ser. No. 637,013, Jan. 3, 1991.

[51] Int. Cl.$^6$ ................. H04J 1/14; H04J 3/12; H04M 11/00
[52] U.S. Cl. ................. 379/93; 379/94; 379/106; 379/107; 370/76; 370/94.2; 370/110.1
[58] Field of Search ................. 370/94.1, 94.2, 370/76; 379/93, 94, 106, 107, 8

[56] References Cited

U.S. PATENT DOCUMENTS

| | | | |
|---|---|---|---|
| 4,238,783 | 12/1980 | Miller | 379/106 |
| 4,442,320 | 4/1984 | James et al. | 42/379 |
| 4,527,235 | 7/1985 | Chebra | 200/364 |
| 4,528,423 | 7/1985 | James et al. | 49/379 |
| 4,529,971 | 7/1985 | James | 508/340 |
| 4,654,868 | 3/1987 | Shelley | 379/107 |
| 4,713,837 | 12/1987 | Gordon | 379/93 |
| 4,799,213 | 1/1989 | Fitzgerald | 370/76 |
| 4,833,618 | 5/1989 | Verma | 379/107 |
| 4,897,865 | 1/1990 | Canuel | 379/93 |
| 4,903,261 | 2/1990 | Baren et al. | 370/94.2 |
| 4,905,231 | 2/1990 | Leung et al. | 370/94.1 |
| 4,972,463 | 11/1991 | Danielson | 379/106 |
| 5,003,534 | 3/1991 | Gerhardt | 370/94.1 |

FOREIGN PATENT DOCUMENTS

| | | |
|---|---|---|
| 150524 | 3/1970 | New Zealand . |
| 218262 | 7/1989 | New Zealand . |
| 215113 | 12/1989 | New Zealand . |
| 2166625 | 11/1984 | United Kingdom . |

OTHER PUBLICATIONS

"Computer Communications", vol. 2, Aug. 1979, Penny et al.

Software and Microsystems, vol. 2, No. 4, Aug. 1983, David Hutchison.

*Primary Examiner*—Stephen Chin
*Assistant Examiner*—Vijay Shankar
*Attorney, Agent, or Firm*—Davis, Bujold & Streck, P.A.

[57] ABSTRACT

A data communications system which comprises at least one group of subscriber data interface elements, with each interface element having at least one data input port and a data output port, and each output port being electrically connectable to a subscriber line of the telephone network to transmit data thereon without interfering with any telephone service that may be present on these subscriber line. A network data interface element, for each group of subscriber data interface elements, being located within a short distance from the farthest subscriber data interface element. Each subscriber data interface element having a data input port and a data output port, and each input port being electrically connectable to a subscriber line of the telephone network and in communication with these subscriber data interface elements thereover. A data collection unit having a data storage mechanism and a plurality of data input ports, with each data input port being connectable to the data output port of a corresponding network data interface element and capable of communicating therewith for collecting and storing the data received from these network data interface elements and assembling the data into a data frame. A data communications network for carrying the data frames produced by the data collection unit to at least one data processing facility.

10 Claims, 3 Drawing Sheets

DATA COLLECTION NETWORK APPARATUS AND METHOD

This is a continuation of application(s) Ser. No. 07/637, 013 filed on Jan. 3, 1991.

FIELD OF THE INVENTION

This invention relates generally to a communications system for carrying telemetry data and more particularly to a system that provides a ubiquitous telemetry or data network utilizing existing telephone outside plant comprising twisted pair copper without adversely impacting or otherwise affecting the plain old telephone service provided on the outside plant. Telemetry data includes site alarm conditions such as fire or unauthorized entry which are typically detected by one or more electronic surveillance devices such as smoke detectors, infrared heat detectors, sonar or infrared intrusion detectors and the like. Telemetry data also includes utility metering information produced by the water, gas or electricity meters. Telemetry data could also include other low speed data originating at the subscriber site such as control information intended to have effect at a location remote from the subscriber site.

BACKGROUND OF THE INVENTION

In the past, these devices have been connected to the public switched telephone network by obtaining a telephone line from the phone company and providing the site to be monitored with a telephone dialler device which is activated by the alarm condition signalled by the above-noted detectors. These prior art monitoring systems communicate with a central site which displays the alarm condition signalled by the monitored site and the operator of the central site contacts the site owners or appropriate civic authority (ie police, fire department etc.) to deal with the alarm condition. Such a scheme requires the installation of an additional telephone line to provide for the service to be carried without interfering with any existing telephone service which the subscriber may have.

The present invention seeks to provide an improved telemetry communications network that does not require a separate telephone line to be operated and can be operated continuously over an existing telephone line without interfering with any use of that line. That is the telemetry communications network will operate irrespective of whether a telephone call is being initiated by rotary or dual tone multi frequency (DTMF) signalling, or is being carried on, or is terminated.

SUMMARY OF THE INVENTION

In one of its aspects the invention provides a data communications system having a plurality of subscriber data interface elements each having at least one data input port and a data output port, said output port adapted to be electrically connected to a subscriber line of the telephone network to transmit data thereon without interfering with any telephone service that may be present on said subscriber line; and a network data interface element, corresponding to each subscriber data interface element, having a data input port and a data output port, said input port adapted to be electrically connected to a subscriber line of the telephone network and in communication with said subscriber data interface element thereover; and at least one data collection unit having a data storage means and a plurality of data input ports, each said data input port for connection to the data output port of a corresponding network data interface element and capable of communicating therewith for collecting and storing the data received from said network data interface elements and assembling the data into a data frame; and a data communications network for carrying the data frames produced by the data collection unit to at least one data processing facility.

In another of its aspects the invention provides a data communications system having a plurality of subscriber data interface elements each having at least one data input port and a data output port, said output port adapted to be electrically connected to a subscriber line of the telephone network to transmit data thereon without interfering with any telephone service that may be present on said subscriber line; and a network data interface element, corresponding to each subscriber data interface element, having a data input port and a data output port, said input port adapted to be electrically connected to a subscriber line of the telephone network and in communication with said subscriber data interface element thereover; and at least one data collection unit having a data storage means and a plurality of data input ports, each said data input port for connection to the data output port of a corresponding network data interface element and capable of communicating therewith for collecting and storing the data received from said network data interface elements and assembling the data into a data frame; and a data communications network for carrying the data frame produced by the data collection unit to at least one data processing facility; and a network control monitor interconnected to said data communications network to monitor traffic on said data communications network and capable of communicating with said data collection unit and said data processing facilities to set configuration parameters of same.

In yet another of its aspects, the invention provides a method of communicating telemetry data including the steps of encoding meter readings into a stream of binary coded electrical signals; periodically, at predetermined intervals, storing each meter reading and processing the meter reading to form a data frame by adding link protocol data, network protocol data and a frame check sequence; forwarding the meter reading to a data processing site.

BRIEF DESCRIPTION OF THE DRAWINGS

A preferred embodiment of the invention will now be described, by way of example, with reference to the accompanying drawings in which.

DETAILED DESCRIPTION

Figure 1:
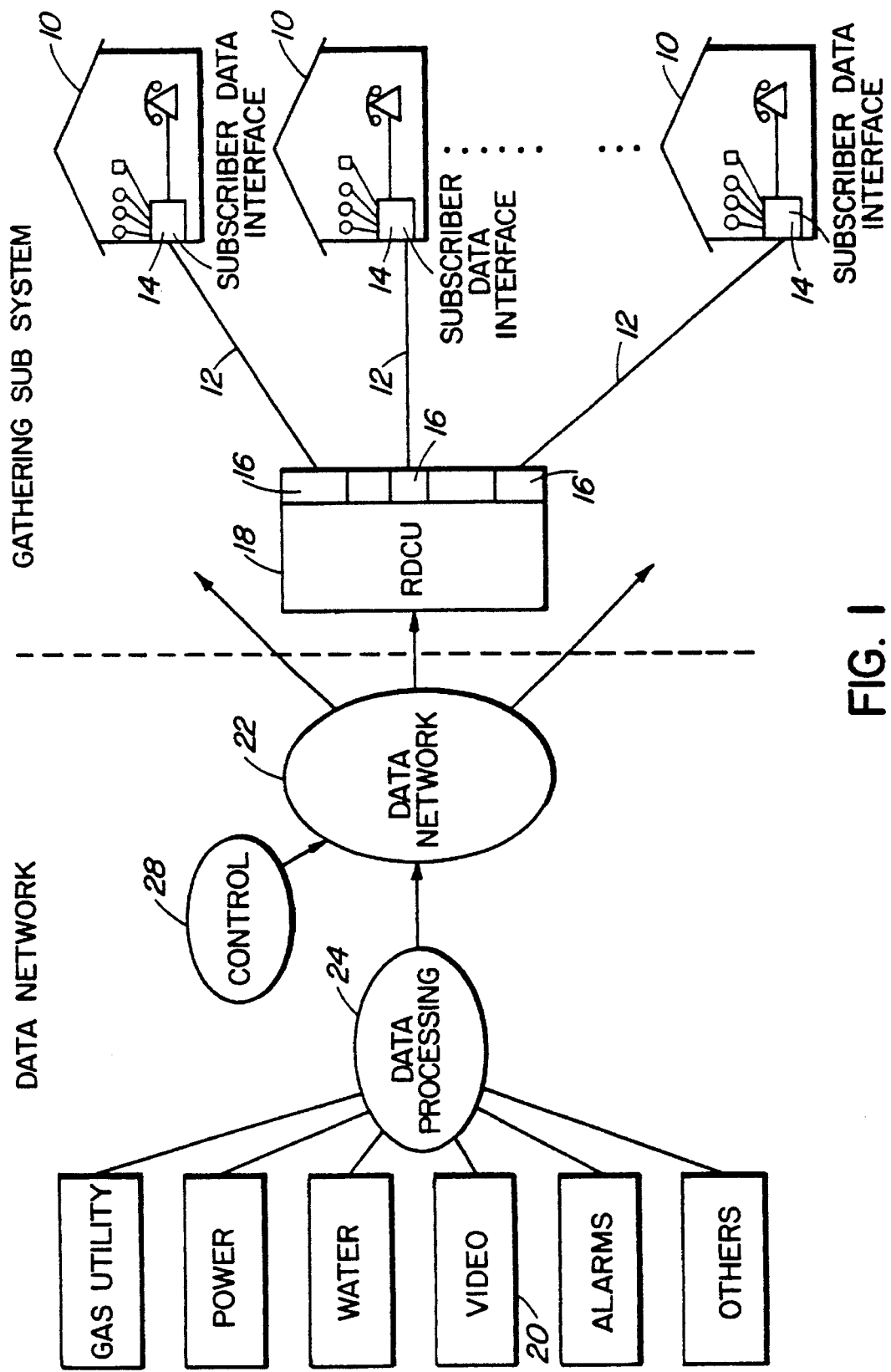
FIG. 1 is a functional block diagram of a telemetry network in accordance with the present invention.

Referring to FIG. 1, the major functional elements of the universal telemetry network are shown. The telemetry network is comprised of two major functional elements referred to as the gathering subsystem and the data network. The gathering subsystem is used by the telemetry network to collect subscriber telemetry data and relay this data to the data network which will then carry the data to processing points for final disposition. Looking in more detail at the gathering subsystem, each subscriber premises 10 is served by a telephone line 12. The telephone line 12 is a typical twisted pair of copper wires also known as a telephone pair.

Located at the subscriber premises is a telephone subscriber data interface unit 14 which is connected to the telephone line 12. The telephone subscriber data interface 14 connects to the telephone line but does not interfere with the provision of telephone service to the subscriber premises by utilizing "voice over data" communications. That is, the telephone interface unit operates at frequencies above 4 KHz to prevent interference with any telephone conversations that may be carried on the telephone line 12. Telephone subscriber data interface 14 is provided with high-pass filters which have a cut off frequency at no less than 3.5 to 4 KHz to prevent any voice signals from entering into the telephone interface unit and to prevent any significant impedance changing effects to the telephone system at the voice frequency thereby avoiding any interruption or interference with the telephone service provided on the telephone line 12.

The first point of collection in a telephone distribution network is typically a serving area concept (SAC) box which serves 400–600 subscribers. This first point of collection is the preferable location to place the remote data collection unit (RDCU) 18 as this will normally ensure that the network data interface 16 in the RDCU 18 will be within 2 kilometers of the telephone subscriber data interface 14. It is preferable to have the distance between the telephone subscriber data interface 14 and the network data interface 16 be 2 KMs or less to ensure that telephone line 12 does not have loading coils on it which would present a high impedance path to the frequencies used by the instant system. It is preferable to use a carrier frequency above the telephone audio range of 3.5 KHz to prevent tones from being heard by the subscriber when using the telephone. In the preferred embodiment, a carrier frequency in the range of 20 KHz is used; which is out of the range of hearing by an individual and signalling is accomplished by frequency shift keying (FSK).

Input to the telephone subscriber data interface 14 can be provided by several classes of devices. The first such class would be devices intended to trigger an alarm condition or other "exceptional" condition which occurs out of the ordinary. Devices of this class would include fire and intrusion alarms or conditions out side the range of acceptable limits ie. temperature too low or too high etc. A second class of devices would be state devices which signal a state that is to be monitored; such as temperature or utility metering values, ie. water meter, gas meter, power meter etc. A third class of devices would be remote control devices that would be used to control or signal a device at a remote location such as a movie request device for activation of a movie machine such as a VCR to play a movie with the pause, fast-forward, rewind, stop etc. functions available to the users of the remote control devices. As will be explained in more detail below, other devices may be connected to the subscriber data interface 14 to effect classes of signalling or control not yet envisioned.

The signalling from the subscriber data interface 14 is carried to a remote data collection unit 18 using one-way single duplex communications over existing telephone line 12. The subscriber data interface 14 produces data for transmission to the remote data collection unit periodically several times a minute. This data transmission scheme allows several repetitions of slower data, such as meter readings, to be sent to the remote data collection unit 18; thus ensuring that, out of the many redundant copies of the data forwarded to the remote data collection unit, a valid copy of the data will be forwarded to the remote data collection unit 18 even where the existing telephone line 12 is electrically noisy.

Remote data collection unit 18 forwards the data collected to one or more data processing facilities generally designated 24 over a suitable data network 22. The data network may be a simple point to point dial up network using modems and long (virtually permanent) connect times over the public switched telephone network. Preferably, the data network is a public or private X.25 packet switched network. An X.25 network is an international standard for packet switched networks and is fully defined in the CCITT (The International Telegraph and Telephone Consultative Committee) Study Group VII Blue Book published following the 9th Plenary Assembly in Melbourne, Australia, 1988 as Volume VIII—Fascicle VIII.2 which contains recommendations X.1 through X.32. Using an X.25 network for the data network 22 is preferable to provide error free data communication and to allow multiple data processing facilities 24 with a minimum of physical communications facilities. The data processing facility 24 may be a single physical system providing services for each of the users of the data collected by the network, ie. meter reading processing for natural gas, electricity, water and alarm processing for fire, burglary etc. Alternately, and preferably, the data processing facility 24 will be several physical sites as required to meet the needs of the meter reading utilities and alarm service companies.

It will be understood that the apparatus and method of data communications in accordance with the present invention is continuous in that the data signalling may be accomplished over the telephone line 12 at all times irrespective of whether a phone service is being delivered on the line or not. That is to say, the data signalling will be operable without interfering with any telephone conversation that may be carrying on over the telephone, and the data signalling will be operable without interfering with any dialling of the telephone whether by rotary pulsing or dual tone multi-frequency (DTMF) dialling, and the signalling will be operable without interfering with any ring signalling that may be present on the telephone line. As a result, "real time" processes may be controlled by use of this system. For example, FIG. 1 shows an audio/video source 20 which may be a Video Cassette Recorder (VCR) or Video disc player that could be paused or rewound by the subscriber from subscriber site 10.

A data collection network architecture in accordance with the present invention provides a network suitable for secure carriage of meter reading or alarm data to the processors of the data. The elements of data security include both the accurate transmission of the meter readings themselves and the certainty to which data can be attributed back to a specific premises and source. The data collection network achieves data integrity by transmitting data frames using a redundant bits to create a frame check mechanism such that each data frame contains information bits as well as redundant bits calculated from the information bits in accordance with a predefined algorithm. Corruption of the data frame is detected when the receiver of the data frame calculates a redundant bit pattern based on the received information bits. The calculated redundant bit pattern is then compared with the bit pattern actually received in the data frame. Any differences in redundant bit patterns indicate a transmission error. The data collection network achieves data security by providing a physical link to specific premises thus ensuring that the origin of the data is known.

Figure 2:
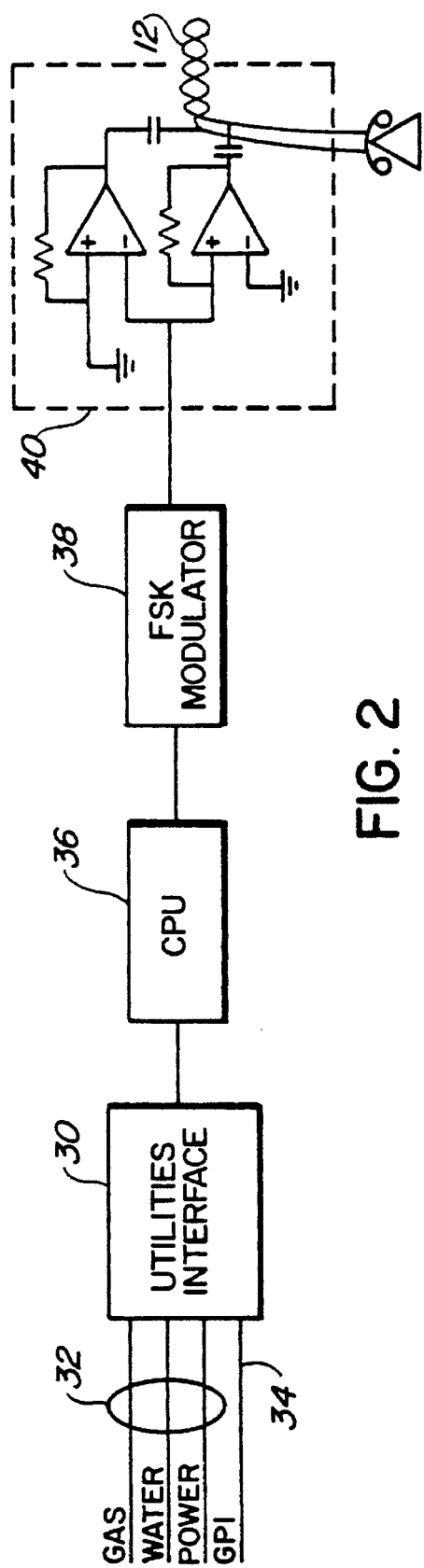
FIG. 2 is a functional block diagram of a subscriber data interface in accordance with the present invention.

Referring now to FIG. 2, which shows a functional block diagram of a subscriber data interface 14 in accordance with the present invention, it is understood that the subscriber data interface 14 transmits data from the subscriber premises into the data collection network. Each subscriber data interface is provided with a data input port 30 which enables devices to be electrically connected to the subscriber data interface 14 to input data into the network. The data to be transmitted is shown, by way of example, to be meter information from gas, water and power meters, through meter input interface lines designated generally as line group 32. The data input port 30 also provides a general purpose interface line (GPIO) 34 which can be used to provide data input from any other manner of device sought to be connected to the network. The meter reading data is read periodically (ie. is polled) by microprocessor 36 which selects the meter input interface line (ie. one line in the group 32) and obtains the data from the selected meter and converts the selected data to a data frame form for transmission. Alternately, data may be presented on the general purpose interface (GPIO) line 34 and the microprocessor (CPU) 36 will read the data from the GPIO line 34 and transmit it as soon as practicable. The real time transmission of the GPIO data is accomplished by one of two methods: the microprocessor 36 can be interrupted when data is present on GPIO line 34, or the microprocessor 36 can check the GPIO line very frequently (ie 5–10 times per second) and frame and transmit any data that is presented on the GPIO line 34. The format of the data frame will be explained in more detail subsequently with reference to FIG. 4. The data frame is then modulated using frequency shift keying (FSK) by FSK modulator 38. The so modulated signal is injected onto existing telephone line 12 through data output port 40 which is essentially a high pass filter that presents a very high impedance to signals in the voice band (ie less than 3–4 KHz) so as not to interfere with conventional use of the telephone. Data output port 40 is provided with a balanced output amplifier to amplify the data signal to permit it to travel the required distances over telephone line 12. A balanced output is used to prevent crosstalk of the signalling to other telephone lines in the cable bundle serving other subscribers in the area. Preferably the data output port capacitively couples to the telephone line 12 using 100 nanofarad capacitors which enable good coupling of the data signal in the 20–30 KHz range and good filtering of the voice band signals which may be present on telephone line 12. The above described subscriber data interface 14 is preferably connected to the telephone line 12 in the subscriber premises after the lightening protection block (not shown) which eliminates the need to have lightening protection in the subscriber data interface 14 thereby reducing the expenses of the device.

Figure 3:
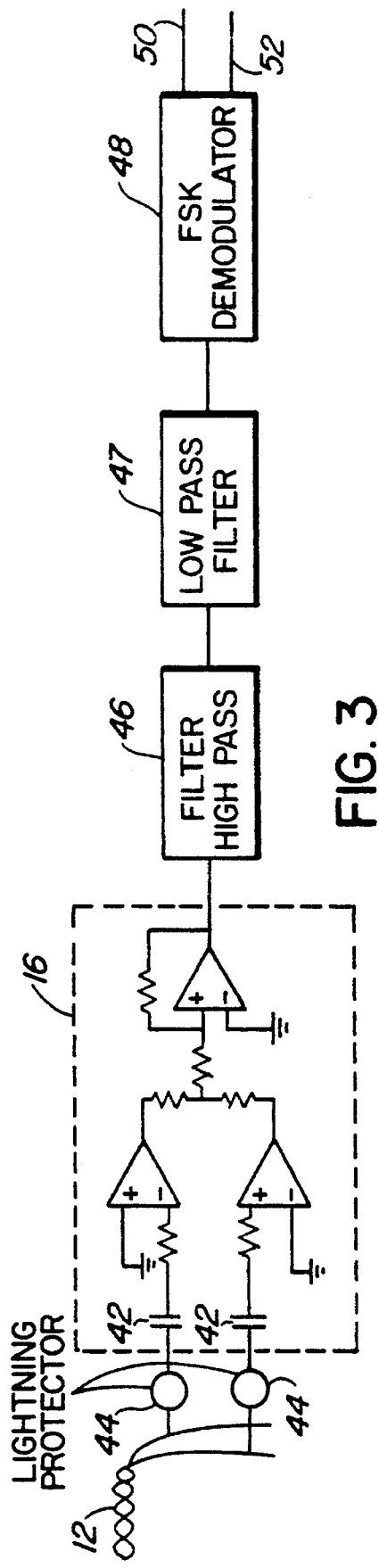
FIG. 3 is a functional block diagram of a network data interface in accordance with the present invention.

FIG. 3 is a functional block diagram of a network data interface in accordance with the present invention. The network data interface is electrically connected to the telephone line 12 at a convenient access point in the outside plant of the telephone network, preferably within 2 kilometers of the subscriber. This access is conveniently provided in telephone access networks at the telephone serving area concept cross connect facility (SAC box). In an urban environment the telephone SAC box will typically be located within 2 KMs of the subscriber. Each telephone SAC box serves in the neighbourhood of 600 subscribers. Located proximate to the telephone SAC box is the remote data collection unit RDCU 18 shown in FIG. 1. Each subscriber line 12 is bridged to a network data interface element 16 using signal coupling capacitors 42 as explained with reference to the subscriber data interface 14 with reference to FIG. 2. Since no lightening protection is provided at the SAC box, it is preferable to isolate the network data interface element 16 from voltage transients on subscriber line 12 using lightening protectors 44. Any suitable lightening protector typical of that used in the telephone industry is acceptable and well known to those skilled in the art. The signal induced in the network data interface element 16 is next high pass filtered by high pass filter 46 As with the subscriber data interface 14, the data input port of the network data interface capacitively couples to the telephone line 12 using 100 nanofarad capacitors which enable good coupling of the data signal in the 20–30 KHz range and good filtering of the voice band signals which may be present on telephone line 12. The data input port may further be provided with a low pass filter 47 having a cut off frequency of about 35 KHz (or any suitable cut off frequency above the data carrier frequency) which eliminates any high frequency noise from entering the demodulator FSK demodulator 48. FSK demodulator 48 is preferably provided with 2 outputs. The first is data line 50 where the data frames received over telephone line 12 and demodulated by demodulator 48 are output for further processing as described below with reference to FIG. 5. The second output is control line 52 which signals the presence of the data carrier on telephone line 12. The control line allows continuous monitoring of the operation of the FSK modulator 38 in subscriber data interface 14 by looking for the carrier signal and providing a signal on the control line 52 indicating the presence or absence of the carrier signal on telephone line 12. The signal on the control line could be a TTL logic level of say 0 volts for no carrier and +5 volts for carrier present. This carrier detection allows the RDCU to raise an alarm condition if the carrier disappears on a telephone line 12 which would be useful where the subscriber has burglar alarms that must be continuously verified to make sure the subscriber line 12 has not been tampered with.

Figure 4:
FIG. 4 is a schematic diagram of a data frame produced by the subscriber data interface.

FIG. 4 is a schematic diagram of a data frame produced by the subscriber data interface. The data frame contains 4 elements of information. At the start of each data frame is a Link Protocol Data Unit (LPDU), followed by a Network Protocol Data Unit (NPDU), followed by the Information data unit of variable size, all followed by a Frame Check Sequence. The LPDU can be one byte (8 bits) long with a predefined flag and frame sequence contained therein. The frame sequence number could take up 4 bits of the byte providing a modulo 16 frame sequence number which would be incremented each time a data frame is sent. The receiving station could use the data frame sequence number to monitor link quality by being able to determine how many data frames are being lost. The NPDU can be one byte (8 bits) long having 4 bits to specify the originating port in the subscriber interface unit 14, for example, "0000" for port 0—the water meter, "0001" for port 1—the gas meter, "0010" for port 2—the electric meter, "0011" for port 4—the GPIO port, "1111" for a supervisory message etc. The remaining 4 bits of the NPDU could then be used to specify the length of the IDU in bytes, ie. a range of 0–15 bytes in length. The IDU would contain any information to be transmitted by the meters or devices attached to the subscriber data interface 14, ie data messages containing meter readings or alarm conditions, etc. or supervisory messages relaying information on the status condition of the subscriber data interface unit 14 itself: ie "01010101"—I'm doing just fine, "10000000"—can't read port 0, "10000001"—can't read port 1 etc. The FCS portion of the data frame would be extra bits calculated from the preceding bits in the data frame. For example, the FCS could be a simple parity bit, or a parity byte. The FCS thus can be recalculated at the receiving station and compared to the FCS actually received to give an independent check on whether the data frame was corrupted in transmission.

Figure 5:
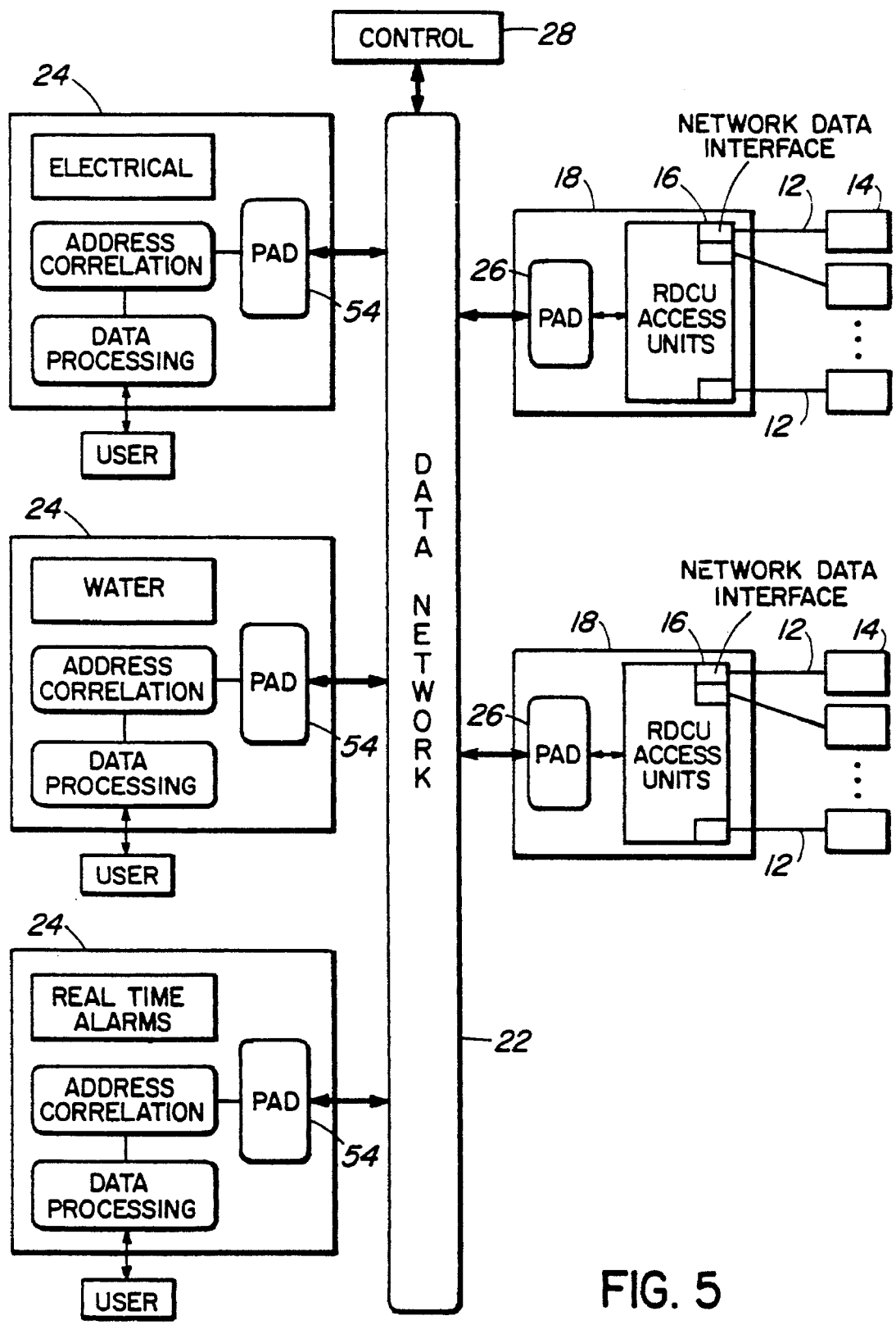
FIG. 5 is a detailed functional block diagram of a telemetry network in accordance with the present invention.

Referring now to FIG. 5 which shows a detailed functional block diagram of a telemetry network in accordance with the present invention. Each of the subscriber data interface units 14 is connected to a corresponding remote data collection unit 18 via existing subscriber telephone line 12. Data from the RDCU 18 is communicated to the data network 22 using a data network interface 26. The data network interface 26 is preferably an X.25 packet assembler disassembler which works very closely with the network control monitor 28. The data network interface 26 converts the data frames into addressed data packets in accordance with the X.25 standard and moves the data frames from the RDCU 18 into the data network 22 and is responsible for detecting the presence or absence of carrier on the network data interface element 16. When carrier is detected, the data network interface 26 could be configured to establish a virtual channel over the data network 22 to one or more of the data processing facilities 24 to allow data to be forwarded to the appropriate data processing facility for processing (ie. electric meter data carried over a virtual circuit to the "Electrical" data processing facility, alarm data carried over a virtual circuit to the "Alarm" data processing facility. A loss of carrier indicated by the network data interface element 16 may cause the data network interface 26 to tear down the virtual circuits and log it for action by the network control monitor 28. The RDCU 18 is provided with storage means capable of storing the data frames received for each subscriber connected to it. The RDCU 18 is capable of receiving instructions from network control monitor 28 to process the data frames received by each network data interface element 16 to forward all data frames as received or forward only data frames that changed from the previous data frame (ie a water meter reading arriving at the RDCU 18 ever 15 minutes might only be given to the data network interface 26 for framing and delivery when a new meter reading arrived) or forward data only when requested from the appropriate data processing facility 24 (ie. forward water meter readings only on request by the "Water" data processing facility). Thus the RDCU 18 is provided with a remotely programmable data filter process which decreases the amount of data loaded onto the data network 22 as controlled by the network control monitor 28 or as controlled by the appropriate data processing facility 24. The data network interface 26 is responsible for appending address information to each data packet (as described with reference to FIG. 4) which will route the packet to the proper data processing facility 24 and will indicate to that facility where the packet originated from.

The network control monitor 28 is responsible for logging and accessing statistics on the data network 22 performance and errors; and reporting and logging network alarm conditions (ie RDCU 18 or data network interface 26 stoppages due to cut lines etc.); and maintaining a data structure containing the configuration database for the data network 22 to allow configuration updates to be sent to the appropriate RDCU 18 and data network interface 26 and data processing network interface 54. The network control monitor 28 is also provided with a debug facility to allow supervisory communications with any data processing facility 24 or RDCU 26 to make status inquiries and corrective updates as well as monitor data packet contents and traffic on data network 22 to maintain operation of the network.

Each data processing facility 24 is provided with a data processing network interface 54 which sends and receives data packets from the data network 22 that are needed for processing at the facility. The data processing facility 24 is provided with storage means for maintaining a data structure equating the data network address of each subscriber with the customer billing data maintained by the utility provider so that usage billing may be produced. Also each data processing facility 24 is given the ability to introduce data packets into the data network 22 to allow the facility to query the RDCU 18 for the current meter reading of a particular subscriber 10 (see FIG. 1).

Now that the invention has been disclosed and illustrative embodiments have been described herein with reference to the accompanying drawings, the present invention is not limited to these particular embodiments. Various changes and modifications may be made thereto by persons skilled in the art without departing from the spirit or scope of the invention, which is defined by the appended claims.

We claim:

1. A data communications system comprising:

a plurality of subscriber data interface elements each having a data input port and a data output port for assembling a data frame, said data output port being electrically connectable to a telephone line, to continuously transmit said data frame thereon, using a carrier signal whose frequency is higher than the voice band;

a plurality of network data interface elements located within a short distance from the farthest subscriber data interface element, a said network data interface elements having a data input port and a data output port, said data input port being electrical connectable to said telephone line and in communication with an associate subscriber data interface element thereover;

a data collection unit having a data storage means for connection to a data output port of a corresponding network data interface element of said plurality of network data interface elements and capable of communicating therewith, for collecting and storing the data frames received from said plurality of network data interface elements;

a data communications network connected to said data collection unit for assembling an addressed data packet from the data frames received from said data collection unit; and at least one data processing facility in connection with a plurality of service companies and with said data network, for processing said addressed data packet, extracting said subscriber data and transferring said subscriber data to a service company indicated in said addressed data packet.

2. A data communications system as claimed in claim 1 wherein said data frame comprises a predefined set of 8 bit data sequences, including:

a link protocol data sequence;

a network protocol data sequence;

a discrete number of information data sequences; and a frame check data sequence.

3. A data communications system as claimed in claim 1 wherein said data collection unit includes a configurable data processing means for processing the data frames for each data input port, said data processing means being configurable to:

forward each data frame as data is received, or forward a data frame only when said data frame is different from a last received data frame, or forward a data frame only on receipt of an instruction to forward the data frame.

4. A data communication system as claimed in claim 1 wherein said data communication network comprises an X.25 packet switched network such that each data frame is converted into said addressed data packet by the introduction of connection, address and error correction octets in accordance with X.25 standard.

5. A data communication system comprising:

a plurality of subscriber data interface elements each having a data input port and a data output port for assembling a data frame, said data output port being electrically connectable to a telephone line, to continuously transmit said data frame thereon, using a carrier signal whose frequency is higher than the voice band;

a plurality of network data interface elements located within a short distance from the farthest subscriber data interface element, a said network data interface elements having a data input port and a data output port, said data input port being electrical connectable to said telephone line and in communication with an associate subscriber data interface element thereover;

a data collection unit having a data storage means for connection to a data output port of a corresponding network data interface element of said plurality of network data interface elements and capable of communicating therewith, for collecting and storing the data frames received from said plurality of network data interface elements;

a data communications network connected to said data collection unit for assembling an addressed data packet from the data frames received from said data collection unit;

at least one data processing facility in connection with a plurality of service companies and with said data network, for processing said addressed data packet, extracting said subscriber data and transferring said subscriber data to a service company indicated in said addressed data packet; and a network control monitor interconnected to said data communications network to monitor traffic on said data communications network and for communicating with said data collection unit and said data processing facilities to set configuration parameters of said data processing facilities.

6. A data communications system as claimed in claim 5 wherein said data frame comprises a predefined set of 8 bit data sequences, including:

a link protocol data sequences;

a network protocol data sequence;

a discrete number of information data sequences; and a frame check data sequence.

7. A data communication system as claimed in claim 5 wherein said data communication network comprises an X.25 packet switched network such that each data frame is converted into said addressed data packet by the introduction of connection, address and error correction octets in accordance with X.25 standard.

8. A data communications system as claimed in claim 1 wherein said data collection unit includes a configurable data processing means for processing the data frames for each data input port, said data processing means being configurable to:

forward each data frame as data is received, or forward a data frame only when said data frame is different from a last received data frame, or forward a data frame only on receipt of an instruction to forward the data frame.

9. A data communications system as claimed in claim 1 wherein the length of said telephone line between said farthest subscriber data interface element and the corresponding network data interface element is shorter than approximately 2 kilometers.

10. A data communications system as claimed in claim 5 wherein the length of said telephone line between said farthest subscriber data interface element and the corresponding network data interface element is shorter than approximately 2 kilometers.

* * * * *